UNITED STATES PATENT OFFICE.

EDWARD D. KENDALL, OF BROOKLYN, NEW YORK, ASSIGNOR, BY DIRECT AND MESNE ASSIGNMENTS, TO READ HOLLIDAY'S SONS.

SULPHONATING ROSANILINE.

SPECIFICATION forming part of Letters Patent No. 421,049, dated February 11, 1890.

Application filed May 1, 1888. Serial No. 93,581. (No specimens.)

*To all whom it may concern:*

Be it known that I, EDWARD D. KENDALL, of the city of Brooklyn, county of Kings, and State of New York, have invented a new and useful Improvement in Coloring-Matters or Dye-Stuffs, of which the following is a full, true, and exact description.

This invention relates to a process of producing a modified rosaniline capable of dyeing in acid baths and to the new rosaniline product the result of this process. I preferably act upon a suitable salt of rosaniline by a proper amount of bisulphate of potash or bisulphate of soda with the aid of heat. The result of this process, which I will hereinafter more fully detail, is a product which may be used for dyeing in an acidified bath or with acid mordants, and which is applicable to purposes for which the ordinary salts of rosaniline, such as "magenta," "fuchsine," or "aniline-red," are not available.

Carrying out my process practically in one way I proceed as follows: I take of dry rosaniline hydrochlorate, sometimes called "chloride of rosaniline," about one pound. This should be suitably heated to expel the moisture which it may contain. It is then to be mixed in a powdered condition with about seven pounds of powdered, fused, or anhydrous bisulphate of potash or bisulphate of soda. I place this mixture in a suitable vessel, preferably one of enameled iron, and heat it to a temperature sufficient to establish chemical action in the mass, as indicated by the change of color and appearance, and by the evolution of hydrochloric-acid gas. I may commence to heat at the temperature of the atmosphere, and I continue the heat gradually until I accomplish the desired result, hereinafter named. The necessary degree of heat may be determined by observing the progress of chemical action in the mass or by occasionally dropping small particles of the mixture into different portions of dilute sulphuric acid until the required shade and brilliancy of color is exhibited. I do not confine myself to the proportions above given. As a rule, the bisulphate should be in excess, because the complete conversion of the rosaniline is thereby insured, and the chemical action is more controllable than when a minimum quantity is used.

An inexpensive source of the potassium or sodium bisulphates is the so-called "niter cake" obtained as a residual product in the manufacture of nitric acid. Niter cake is of variable composition, but may be utilized for the purpose. By the term "bisulphate" I mean to include any sulphate wholly or in part composed of a higher sulphate than bipotassic sulphate, $(K_2SO_4.)$

What I claim as my invention, and desire to secure by Letters Patent, is—

The process of sulphonating rosaniline herein described, which consists in mingling dry bisulphate of soda or bisulphate of potash and rosaniline, and in heating the same dry until the desired degree of sulphonation is obtained, substantially as described.

EDWARD D. KENDALL.

Witnesses:
GEO. H. EVANS,
WM. A. POLLOCK.